Jan. 22, 1957   J. DENBY ET AL   2,778,653
FOLDING PERAMBULATORS
Filed April 14, 1954   3 Sheets-Sheet 1
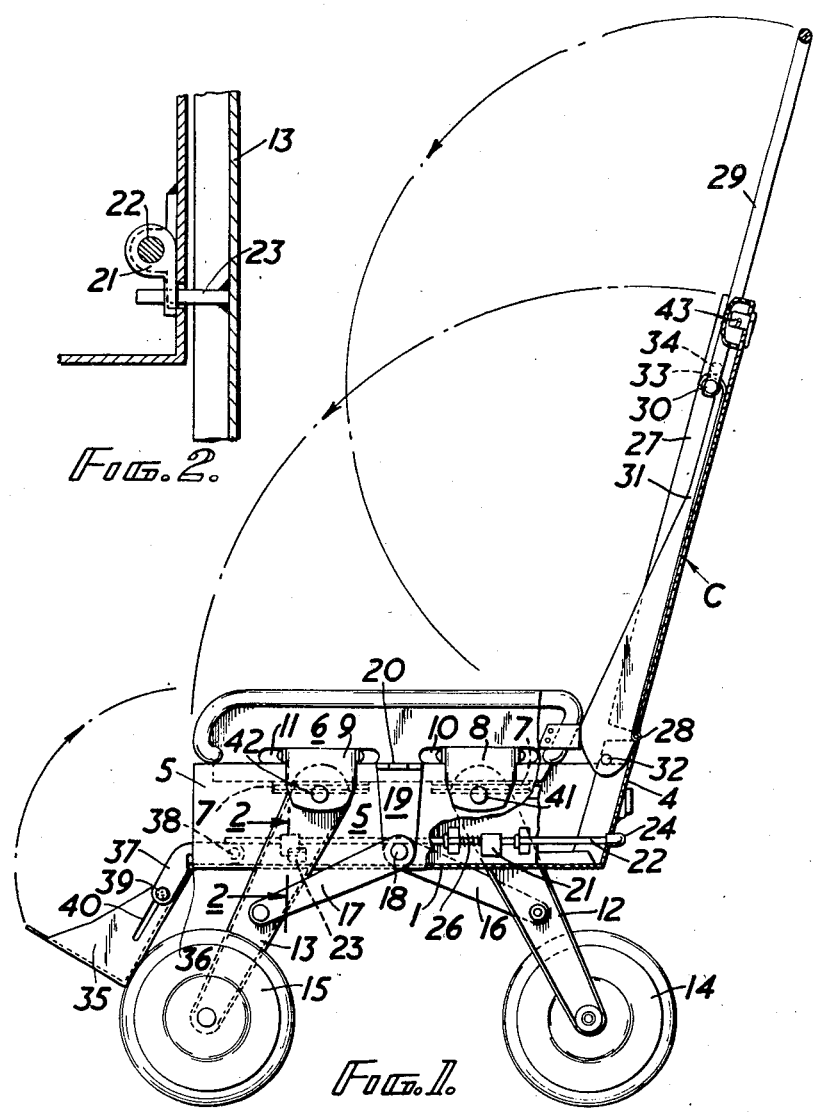
INVENTORS
Jack Denby
Maurice Landi
BY
ATTORNEYS Jan. 22, 1957  J. DENBY ET AL  2,778,653
FOLDING PERAMBULATORS
Filed April 14, 1954  3 Sheets-Sheet 2
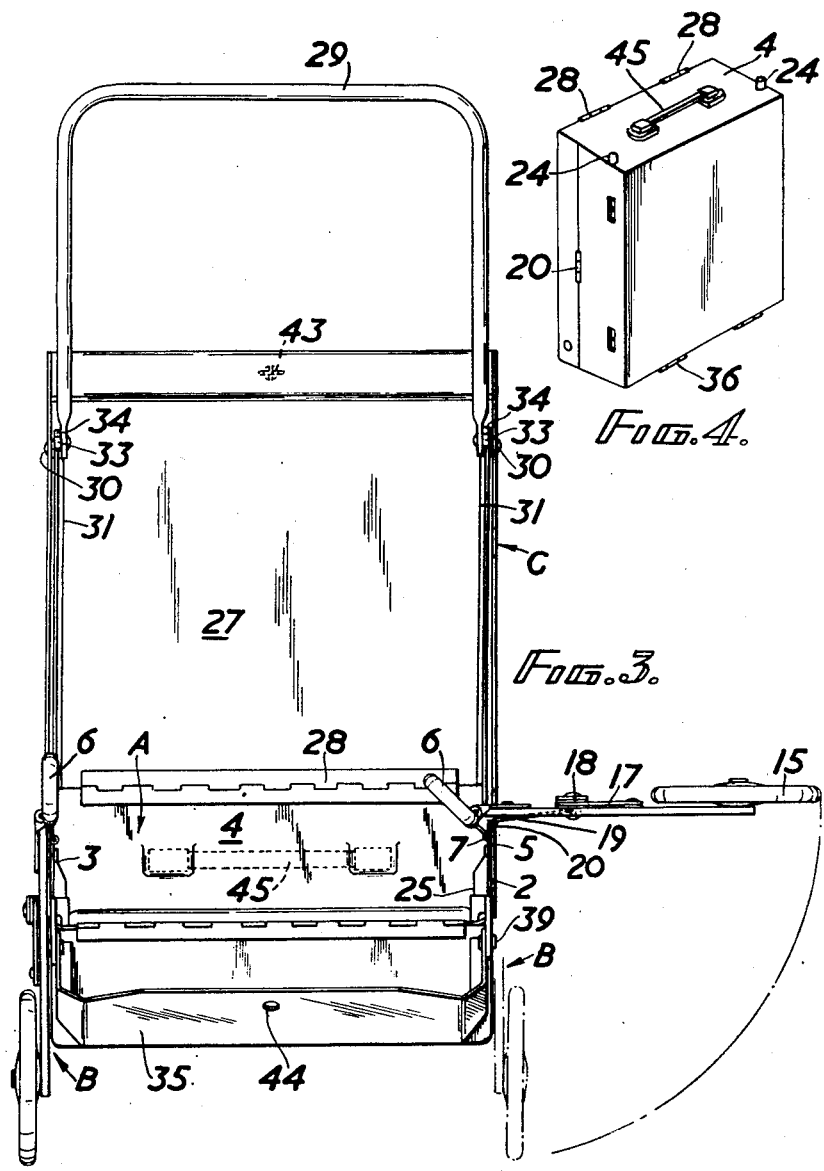
INVENTORS
BY
ATTORNEYS

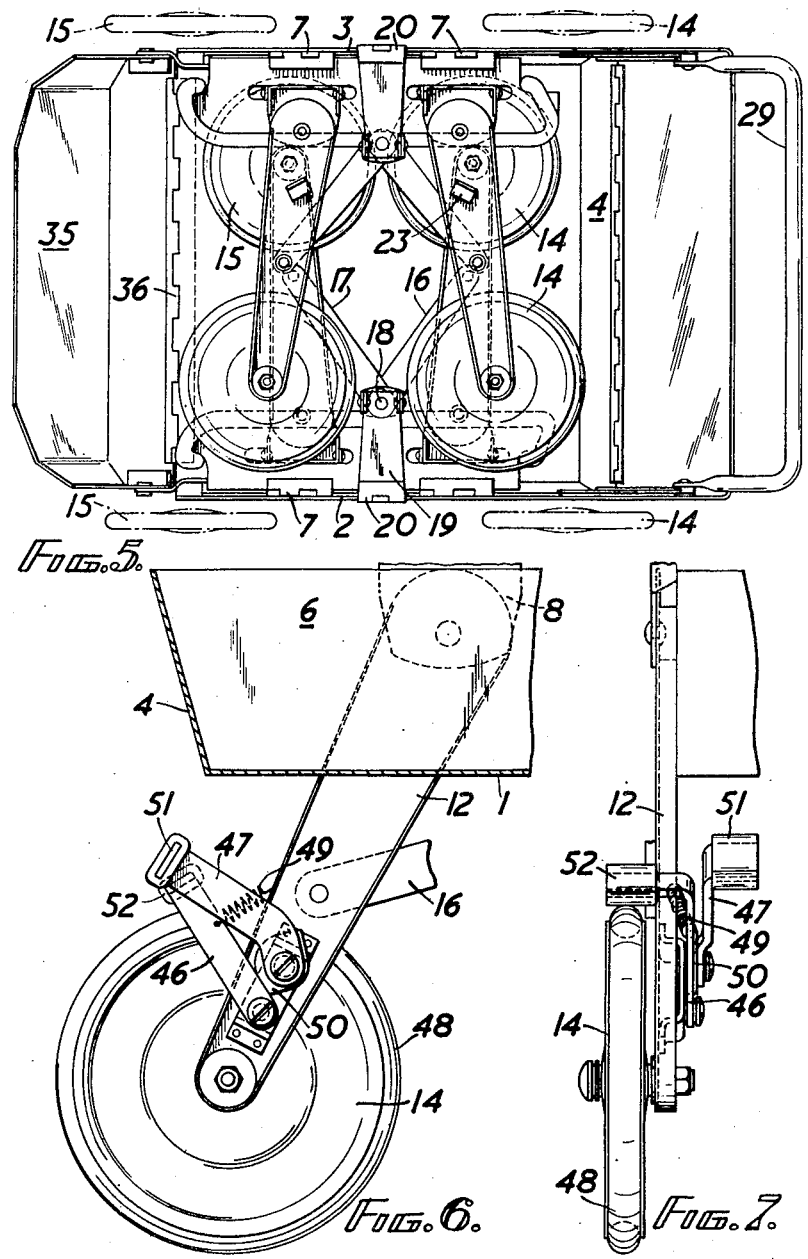

United States Patent Office 2,778,653
Patented Jan. 22, 1957

2,778,653
FOLDING PERAMBULATORS

Jack Denby and Maurice Landi, London, England

Application April 14, 1954, Serial No. 423,095

8 Claims. (Cl. 280—37)

This invention relates to a folding perambulator for wheeling a child, hereinafter referred to as a folding perambulator, of the kind that can be folded into a collapsed condition in which it occupies a small space and can be more easily carried or stored.

The folding perambulator of the present invention comprises a base, sides and a back which together form a seat member, two pairs of wheels one on each side of the seat member, a supporting member for each wheel, the supporting members for the pair of wheels on one side of the seat member being pivotally connected to that side of the seat member and the supporting members for the other pair of wheels being pivotally connected to the other side of the seat member so as to enable each pair of wheels to be swung between a collapsed position in which it lies close above the base of the seat member and a wheeling position, link mechanism interconnecting the supporting members for each pair of wheels and adapted to cause the wheels, when they are swung into the collapsed position, to approach one another to such an extent that they lie within the area of the base of the seat member and, when they are swung into the wheeling position to recede from one another to such an extent that their extremities lie beyond the front and rear ends of the seat member, locking means for releasably holding each pair of wheels in the wheeling position, and a back member hinged to the back of the seat member so as to be foldable over the wheels when they are in the collapsed position to form a portable pack.

A folding perambulator constructed in accordance with the invention is described by way of example with reference to the accompanying drawings in which:

Fig. 1 is a side elevation, partly cut away, of the perambulator in the wheeling position;

Fig. 2 is an enlarged section in the direction 2—2 of Fig. 1;

Fig. 3 is a front elevation of the perambulator with one wheel assembly partially collapsed;

Fig. 4 is a perspective view of the perambulator when folded up ready for carrying;

Fig. 5 is a plan view of the perambulator with the wheel assemblies in the collapsed position;

Fig. 6 is a side elevation showing a brake mechanism fitted to the wheel-supporting member of the nearside rear wheel; and Fig. 7 is a rear elevation of the brake mechanism shown in Fig. 6.

Referring to the drawings, the perambulator consists generally of a seat member A to which are attached two wheel assemblies B each of which comprises two wheels and wheel supporting members and interconnecting links for retracting the wheels and their supporting members as described below. A back member C is hinged to the rear of the seat member and a footrest is hinged to the front of the seat member.

The seat member consists of a base 1 for the seat, sides indicated generally at 2 and 3, and a back 4. The side 2 consists of a side panel 5 to which there is connected a side flap 6 by means of two hinges 7 on the inside of the side panel 5 which enables the side flap to swing inwardly. The side 3 is exactly similar and will not be described in detail.

Since the two wheel assemblies are exactly similar to one another, only the one attached to the side 2 will be described in detail. Two brackets 8, 9 are connected to the outside of the side flap 6 by means of hinges 10, 11 respectively of which the common axis is parallel to the common axis of the hinges 7. Two wheel-supporting struts 12, 13 on the lower ends of which are mounted the wheels 14, 15 respectively, are pivotally connected at their upper ends to the brackets 8, 9 respectively. Two links 16, 17 are pivotally connected at their outer ends to the struts 12, 13, respectively, and at their inner ends are connected by a common pivot 18 to the lower end of an arm 19 which is connected at its upper end to the top of side panel 5 by means of a hinge 20 of which the axis is parallel to the axes of the hinges 7, 8 and 9.

The wheel assemblies are each held in the wheeling position by exactly similar spring-loaded catches which engage with abutments on the inner sides of the wheel-supporting struts which project through holes in the side 2. The catch on the nearside is shown in Figs. 1 and 2. Two locking members 21 fixed to a rod 22 engage with abutments 23 which project from the inner sides of the wheel-supporting struts 12, 13. The rod 22 is provided at the rear with a knob 24 which projects through a hole in the back 4 of the seat member. The rod is located between the side panel 5 of the seat member and a housing 25, and may be pushed forwards against the action of a spring 26 in order to release the catch and allow the wheels to be swung over on to the seat when the perambulator is to be collapsed.

A back rest 27 is connected by means of a hinge 28 to the back 4 of the seat member. A curved bar 29 connected to the inside of the back rest 27 by means of pivots 30 forms a handle by which the perambulator may be wheeled. The back rest 27 is held in the wheeling position by means of stays 31 connected at their lower ends to the seat member by means of pivots 32. At their upper ends 33 the stays 31 curve over the pivots 30 and are held firmly against the pivots 30 by means of pillars 34 projecting outwardly from the handle 29.

A foot-rest 35 is connected to the front edge of the base 1 of the seat member by means of a hinge 36 and held in operative position by means of two cranked arms 37 each of which has an end connected on to each side panel of the seat member by pivots 38. Pins 39 project inwardly from the other end of each of the arms 37 and engage with slots 40 in the sides of the foot-rest 35.

A brake mechanism is fitted to one or both of the rear wheels of the perambulator mechanism or fitted to the nearside rear wheel 14 being shown in Figs. 6 and 7. Two levers 46 and 47 are pivotally connected to the inside of the wheel-supporting strut 12. The lower lever 46 carries at its free end a block 52 which bears against the outer edge of the tyre 48 of the wheel 14 when the lever 46 is pressed down against the action of a spring 49 connecting it to the strut 12 by means of the cam 50 operated by the lever 47. The free end of the lever 47 is provided with a foot pad 51 so that it may easily be depressed by foot when it is desired to apply the brakes. When the brakes are on, a flat surface on the cam 50 bears against the lever 46 and the shape of the cam 50 provides an over-centre action and so prevents the brakes from releasing until the lever 47 is raised initially against the action of the spring 49.

The folding operation by which the perambulator may be collapsed will now be described. The wheel assembly, for example the one on the right side as seen in Fig. 3, is first collapsed in the following way.

The knob 24 is pushed in against the action of the spring 26 thereby bringing the locking members 21 out of engagement with the abutments 23 on the wheel assembly which can then be swung over on to the seat. The brackets 8, 9 to which the wheel-supporting struts 12, 13 are connected pivot about the hinges 10, 11 while the arm 19, to which the links 16, 17 are connected pivots about the hinge 20. Initially the axis of the hinges 8, 9 is close to the axis of the hinge 20 and thus the whole wheel assembly swings without any significant movement of one part of it relative to another. However, as a result of the fact that the hinges 8, 9 are attached to the side flap 6, which is itself hinged at 7, the axis of the hinges 8, 9 recedes from the axis of the hinge 20 as the wheel assembly is swung over and the side flap 6 swings down. When the wheel assembly has been swung over to the position at which the wheels 14, 15 first become further from the axis of the hinge 20 than from the axis of the hinges 8, 9, swinging the wheel assembly further over causes the links 16, 17 to pivot about the pivot 18 in such a way that the wheel-supporting struts pivot about the pivots 41 and 42 and are drawn together so that the wheels 14, 15 and wheel-supporting members 12, 13 lie wholly within the area of the base 1 of the seat member. The other wheel assembly is then swung over in a similar way so that it lies on the top of the first wheel assembly as shown in Fig. 5.

The foot-rest 35 is next swung upwardly about the hinge 36 and the pin 39 slides to the other end of the slot 40 while the arm 37 swings about the pivot 38 until the foot rest 35 forms one end of the pack into which the perambulator collapses.

The handle 29 is then swung down thereby releasing the stay 31 and allowing the back 27 to fold down over the collapsed wheel assemblies to close the pack completely. The catch 43 engages with the hole 44 in the foot-rest and the perambulator may then easily be carried by means of the handle 45 attached to the back 4 of the seat member. Thus, it will be seen that the sides 2, 3, back 4 and base of the seat member together with the foot-rest forming a front wall of the seat member, and the collapsed back rest 27, form a completely enclosed portable pack.

We claim:

1. A folding perambulator comprising a base, sides and a back which together form a seat member, two pairs of wheels, one on each side of the seat member, a supporting member for each wheel, the supporting members for the pair of wheels on one side of the seat member being pivotally connected to that side of the seat member and the supporting members for the other pair of wheels being pivotally connected to the other side of the seat member so as to enable each pair of wheels to be swung between a collapsed position in which it lies close above the base of the seat member and a wheeling position, link mechanism interconnecting the supporting members for each pair of wheels and adapted to cause the wheels, when they are swung into the collapsed position, to approach one another to such an extent that they lie within the area of the base of the seat member and, when they are swung into the wheeling position, to recede from one another to such an extent that their extremities lie beyond the front and rear ends of the seat member, locking means for releasably holding each pair of wheels in the wheeling position, and a back member hinged to the back of the seat member so as to be foldable over the wheels when they are in the collapsed position to form a portable pack.

2. A folding perambulator comprising a base, sides and a back which together form a seat member, two pairs of wheels, one on each side of the seat member, a supporting member for each wheel, hinges to one part of each of which is pivotally connected one of said supporting members and the other part of each of which is connected to a side of the seat member so that the said supporting members for the pair of wheels on one side of the seat member are connected to that side of the seat member and the supporting members for the other pair of wheels are connected to the other side of the seat member in such a way that each pair of wheels can be swung between a collapsed position in which the wheels lie close above the base of the seat member and within the area thereof and a wheeling position in which the wheels are displaced apart so that their extremities lie beyond the front and rear ends of the seat member, two pairs of links, two arms, hinges for said arms, the links of each pair being pivotally connected at their outer ends one to each supporting member of one pair of wheels and at their inner ends to one of the said arms, the hinges of the arms and the hinges of the supporting members being so connected to the sides of the seat member that, during at least a part of the movement of each pair of wheels between its wheeling and collapsed positions, the distance between the axis of each arm hinge and the line joining the outer pivots of the links connected to the arm is changed in such manner that in the collapsed position of each pair of wheels the distance between said outer pivots is less than it is in the wheeling position, locking means for releasably holding each pair of wheels in the wheeling position, and a back member hinged to the back of the seat member so as to be foldable over the wheels when they are in the collapsed position to form a portable pack.

3. A folding perambulator comprising a base, sides and a back which together form a seat member, two pairs of wheels, one on each side of the seat member, a supporting member for each wheel, hinges to one part of each of which is pivotally connected one of said supporting members and the other part of each of which is connected to a side of the seat member so that the said supporting members for the pair of wheels on one side of the seat member are connected to that side of the seat member and the supporting members for the other pair of wheels are connected to the other side of the seat member in such a way that each pair of wheels can be swung between a collapsed position in which the wheels lie close above the base of the seat member and within the area thereof and a wheeling position in which the wheels are displaced apart so that their extremities lie beyond the front and rear ends of the seat member, two pairs of links, two arms, hinges for said arms, two inwardly turnable flaps hinged one to each side of the seat member the links of each pair being pivotally connected at their outer ends one to each supporting member of one pair of wheels and at their inner ends to one of the said arms, the hinges of the arms, on the one hand, and the hinges of the supporting members, on the other hand, being attached one directly to the sides of the seat member and the other to the said flaps so that, when each pair of wheels is swung from the wheeling position to the collapsed position, the distance between each arm hinge and the axis of the hinges of the supporting members on that side is increased by the inward turning of the flap so that the distance between the axis of each arm hinge and the line joining the outer pivots of the links connected to the arm is changed in such manner that in the collapsed position of each pair of wheels the distance between said outer pivots is less than it is in the wheeling position, locking means for releasably holding each pair of wheels in the wheeling position, and a back member hinged to the back of the seat member so as to be foldable over the wheels when they are in the collapsed position to form a portable pack.

4. A folding perambulator comprising a base, sides and a back which together form a seat member, two pairs of wheels, one on each side of the seat member, a supporting member for each wheel, hinges to one part of each of which is pivotally connected one of said supporting members and the other part of each of which is connected to a side of the seat member so that the said supporting members for the pair of wheels on one side of the seat member are connected to that side of the seat member and the supporting members for the other pair of wheels are connected to the other side of the seat member in such a way that each pair of wheels can be swung between a collapsed position in which the wheels lie close above the base of the seat member and within the area thereof and a wheeling position in which the wheels are displaced apart so that their extremities lie beyond the front and rear ends of the seat member, two pairs of links, two arms, hinges for said arms, two inwardly turnable flaps hinged one to each side of the seat member the links of each pair being pivotally connected at their outer ends one to each supporting member of one pair of wheels and at their inner ends to one of the said arms, the hinges of the arms being attached directly to the sides of the seat member and the hinges of the supporting members being attached to the said flaps so that, when each pair of wheels is swung from the wheeling position to the collapsed position, the distance between each arm hinge and the axis of the hinges of the supporting members on that side is increased by the inward turning of the flap so that the distance between the axis of each arm hinge and the line joining the outer pivots of the links connected to the arm is changed in such manner that in the collapsed position of each pair of wheels the distance between said outer pivots is less than it is in the wheeling position, locking means for releasably holding each pair of wheels in the wheeling position, and a back member hinged to the back of the seat member so as to be foldable over the wheels when they are in the collapsed position to form a portable pack.

5. A folding perambulator as claimed in claim 1 in which the locking means for each pair of wheels is releasable only from the rear of the perambulator.

6. A folding perambulator as claimed in claim 1 in which the locking means for each pair of wheels comprises catches on the said supporting members and a bar which is movably mounted inside the side of the seat member to which the said supporting members are pivotally connected for releasably engaging the said catches and which is operable from the rear of the perambulator only.

7. A folding perambulator as claimed in claim 1 comprising a handle for wheeling the perambulator, said handle being pivotally connected to the back member so as to be foldable within the area of the back member.

8. A folding perambulator as claimed in claim 1 in which there is provided a footrest hinged to the base of the seat member so as to be foldable into an inoperative position to form a front wall of the seat member and in which the seat member, back member and footrest can together form a completely enclosed portable pack.

References Cited in the file of this patent
UNITED STATES PATENTS

| | | |
|---|---|---|
| 877,350 | Long | Jan. 21, 1908 |
| 2,587,688 | Bosk | Mar. 4, 1952 |